(12) United States Patent
Park et al.

(10) Patent No.: US 8,304,494 B2
(45) Date of Patent: *Nov. 6, 2012

(54) POLYCARBONATE RESIN COMPOSITION WITH IMPROVED SCRATCH RESISTANCE AND MELT FLOW INDEX

(75) Inventors: Sang Ki Park, Uiwang-si (KR); Kee Hae Kown, Uiwang-si (KR); Jin Hwa Chung, Uiwang-si (KR); Jin Hwan Choi, Uiwang-si (KR); Yun Kyu Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 294 days.

This patent is subject to a terminal disclaimer.

(21) Appl. No.: 12/642,904

(22) Filed: Dec. 21, 2009

(65) Prior Publication Data

US 2010/0168272 A1 Jul. 1, 2010

(30) Foreign Application Priority Data

Dec. 26, 2008 (KR) ........................ 10-2008-0134759

(51) Int. Cl.
*C08L 69/00* (2006.01)
*C08L 33/10* (2006.01)
(52) U.S. Cl. ........................................ 525/133; 525/148
(58) Field of Classification Search .................... None
See application file for complete search history.

(56) References Cited

U.S. PATENT DOCUMENTS

| | | | |
|---|---|---|---|
| 4,045,514 A | 8/1977 | Iwahashi et al. | |
| 4,745,029 A | 5/1988 | Kambour | |
| 4,906,696 A * | 3/1990 | Fischer et al. | ................ 525/148 |
| 5,061,558 A | 10/1991 | Fischer et al. | |
| 5,200,492 A | 4/1993 | Ohnaga et al. | |
| 5,284,916 A | 2/1994 | Drzewinski | |
| 5,449,557 A | 9/1995 | Liebler et al. | |
| 2010/0029855 A1 | 2/2010 | Matsuoka et al. | |
| 2010/0152357 A1 | 6/2010 | Kwon et al. | |
| 2010/0168272 A1 | 7/2010 | Park et al. | |
| 2010/0256288 A1 | 10/2010 | Kim et al. | |
| 2011/0009524 A1 | 1/2011 | Kwon et al. | |
| 2011/0021677 A1 | 1/2011 | Kwon et al. | |
| 2011/0040019 A1 | 2/2011 | Kwon et al. | |
| 2011/0160380 A1 * | 6/2011 | Kwon et al. | ................ 524/508 |

FOREIGN PATENT DOCUMENTS

| | | |
|---|---|---|
| EP | 2204412 A1 | 7/2010 |
| JP | 04-023856 A | 1/1992 |
| JP | 04-359954 A | 12/1992 |
| JP | 06-313089 A | 11/1994 |
| JP | 2001-049072 A | 2/2001 |
| JP | 2002080676 * | 3/2002 |
| JP | 2006-249292 A | 9/2006 |
| JP | 2006-257284 A | 9/2006 |
| KR | 2004-79118 A | 9/2004 |
| WO | 2007/119920 A1 | 10/2007 |
| WO | WO 2007/140101 * | 12/2007 |
| WO | 2008/081791 A1 | 7/2008 |
| WO | 2009/078593 A1 | 6/2009 |
| WO | 2009/113762 A2 | 9/2009 |
| WO | 2009/116722 A1 | 9/2009 |
| WO | 2009/116722 A2 | 9/2009 |
| WO | 2009/128601 A1 | 10/2009 |

OTHER PUBLICATIONS

Xu, Prediction of Refractive Indices of Linear Polymers . . . ; Polymer 45 (2004); pp. 8651-8659.*
European Search Report in counterpart European Patent Application No. 09180634, completed on Feb. 2, 2010.
European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
Office Action in commonly owned U.S. Appl. No. 12/631,018 mailed Nov. 8, 2011, pp. 1-10.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
European Search Report in commonly owned European Application No. 10196806 dated Apr. 27, 2011, pp. 1-5.

* cited by examiner

*Primary Examiner* — David Buttner
(74) *Attorney, Agent, or Firm* — Sunma, Additon & Ashe, P.A.

(57) ABSTRACT

A polycarbonate resin composition of the present invention comprises about 40 to about 99% by weight of a polycarbonate resin (A), about 1 to about 60% by weight of an acrylic copolymer (B) having a high refractive index and a flexible structure, and about 0 to about 60% by weight of acrylic resin (C). A polycarbonate resin composition of the present invention can have excellent transparency and scratch resistance without requiring extra compatibilizers by including an acrylic copolymer having a high refractive index and a flexible structure with the polycarbonate resin.

12 Claims, 2 Drawing Sheets

[Fig 1a]
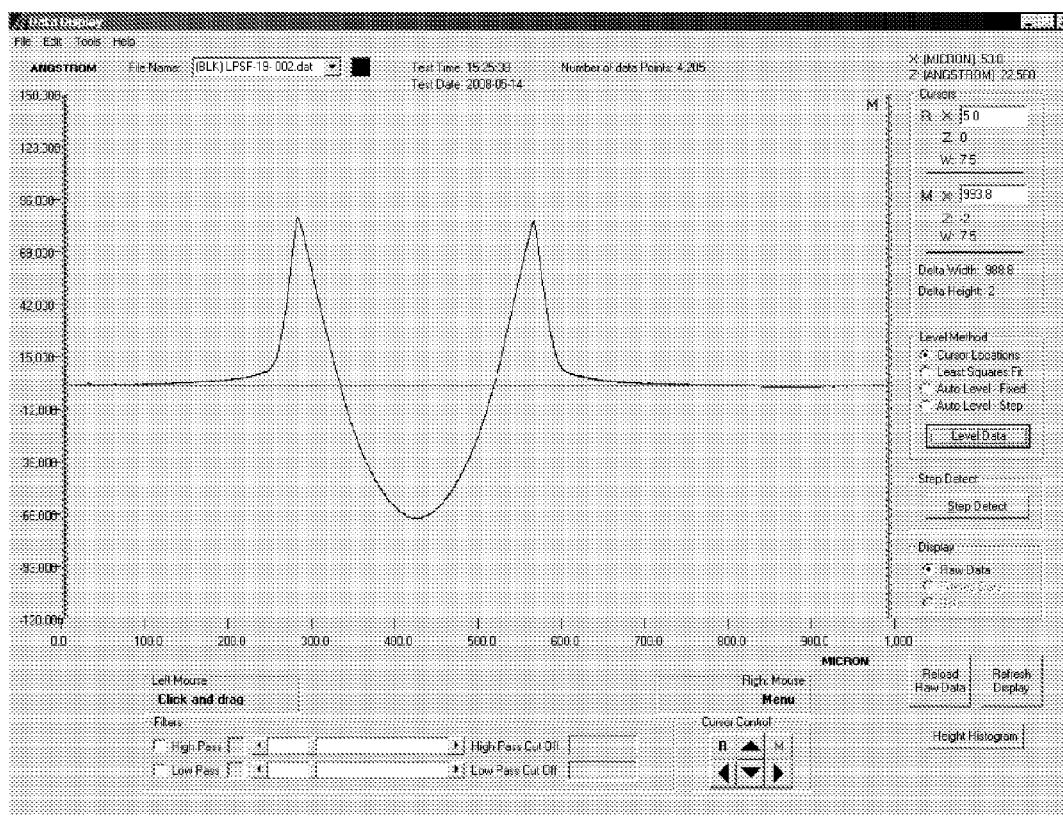

[Fig 1(b)]
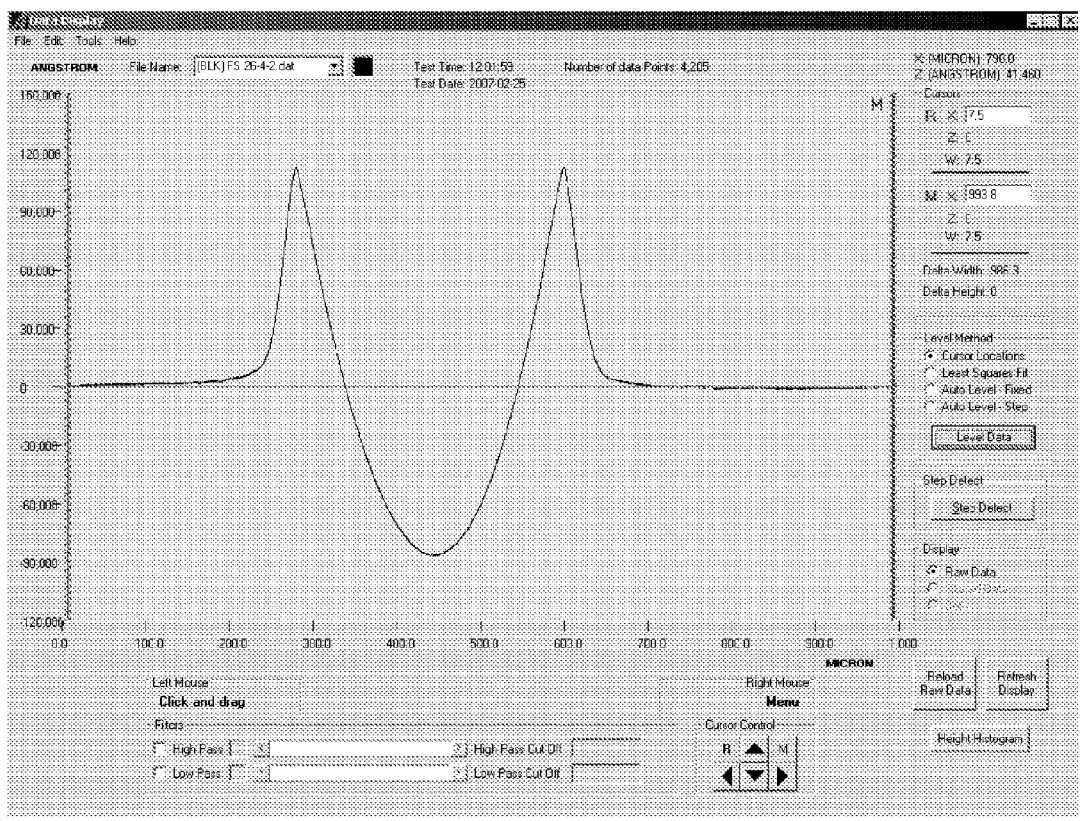

POLYCARBONATE RESIN COMPOSITION WITH IMPROVED SCRATCH RESISTANCE AND MELT FLOW INDEX

CROSS REFERENCE TO RELATED APPLICATIONS

This application claims priority from Korean Patent Application No. 2008-0134759 filed Dec. 26, 2008 in the Korean Intellectual Property Office, the disclosure of which is incorporated herein by reference in its entirety.

FIELD OF THE INVENTION

The present invention relates to a polycarbonate resin composition.

BACKGROUND OF THE INVENTION

Generally, thermoplastic resins can have an excellent balance of physical properties and excellent moldability, and can be a substitute for glass or metal due to their low specific gravity. Accordingly, thermoplastic resins are widely used for various products such as automobile parts, electrical/electronic appliances, and the like.

Recent trends require lower prices, reduced weight, and scaled up sizes of electrical/electronic appliances. Accordingly, products formed of thermoplastic resins are increasingly used for housing materials of deluxe appliances such as LCDs, PDPs, TVs, audio equipment, and the like.

The functionality, performance and appearance of such housing materials are important, and demand for scratch resistance has also increased. At the same time, such products increasingly include complex shapes and/or thin film components. Therefore, moldability of the resins is also an important consideration.

Polycarbonate resin is an engineering plastic having excellent mechanical strength, heat resistance, transparency, weather resistance, flame resistance and the like. Accordingly, polycarbonate resin is used widely for electrical/electronic appliances, automobile parts, building materials and the like. Polycarbonate resin can also be a substitute for glass in applications demanding both transparency and impact resistance such as lens. However, polycarbonate resin has poor scratch resistance.

One method for improving scratch resistance includes applying a hybrid material on a surface of a molded product and hardening the hybrid material using UV radiation. Another method for improving scratch resistance includes coating acrylic resin having excellent scratch resistance or painting urethane resin on a molded product. However, these methods are time consuming due to the additional post-processing steps and also can cause environmental pollution.

Scratch resistance of a polycarbonate having existing excellent physical properties can be improved by mixing acrylic resin such as polymethyl methacrylate having excellent scratch resistance with polycarbonate resin having excellent flame resistance or physical properties such as impact strength. The acrylic resin such as polymethyl methacrylate can have excellent transparency, weather resistance, physical strength, and surface gloss, and can improve scratch resistance.

However, polycarbonate/acrylic resin blends do not have high transparency and coloring properties due to low compatibility and the difference between the refractive indices of the resins. Thus, the use of polycarbonate/acrylic resin blends is limited in housings for electrical/electronic appliances requiring complex shapes and/or a thin film. The use of such blends is further complicated due to the high melting viscosity of polycarbonate.

SUMMARY OF THE INVENTION

The present invention provides a polycarbonate resin composition which can exhibit high fluidity.

The present invention also provides a polycarbonate resin composition which can have improved compatibility.

The present invention further provides a polycarbonate resin composition which can exhibit excellent transparency, appearance and scratch resistance.

The present invention further provides a polycarbonate resin composition which can exhibit excellent high fluidity, scratch resistance, appearance and transparency.

The present invention further provides a molded article which is prepared from the polycarbonate resin composition.

The polycarbonate resin composition of the present invention comprises about 40 to about 99% by weight of a polycarbonate resin (A) and about 1 to about 60% by weight of an acrylic copolymer (B) having a high refractive index and a flexible structure. The polycarbonate resin composition of the present invention can further optionally comprise about 0 to about 60% by weight of an acrylic resin (C).

The acrylic copolymer (B) having a high refractive index and a flexible structure can include a copolymer or a combination of copolymers prepared by copolymerizing about 5 to about 99.9% by weight of one or more aromatic or aliphatic methacrylate monomers (b1) represented by the following formula 1, formula 2, or a combination thereof, about 0 to about 94.5% by weight of one or more unsaturated monomers (b2), and about 0.1 to about 40% by weight of one or more acrylic monomers (b3) with high fluidity represented by the following formula 3.

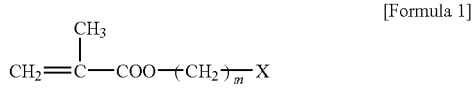

[Formula 1]

wherein:

m is 0 to 10, and

X comprises cyclohexyl, phenyl, methyl phenyl, methylethyl phenyl, methoxy phenyl, cyclohexyl phenyl, chloro phenyl, bromo phenyl, phenyl phenyl, or benzyl phenyl; and

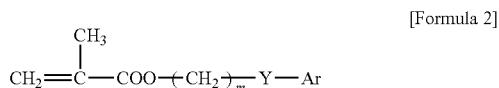

[Formula 2]

wherein:

m is 0 to 10,

Y is O or S, and

Ar comprises cyclohexyl, phenyl, methyl phenyl, methylelthyl phenyl, methoxy phenyl, cyclohexyl phenyl, chloro phenyl, bromo phenyl, phenyl phenyl or benzyl phenyl,

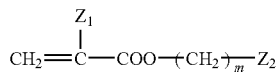

$$\text{[Formula 3]}$$

wherein:

m is 4 to 20, and

Z1 and Z2 are each independently methyl or hydrocarbon.

The acrylic copolymer (B) having a high refractive index and a flexible structure may have a weight average molecular weight of about 20,000 to about 400,000 and a refractive index of about 1.495 to about 1.570.

The acrylic resin (C) may have a weight average molecular weight of about 20,000 to about 200,000 and a refractive index of about 1.490 to about 1.570.

The present invention now will be described more fully hereinafter in the following detailed description of the invention.

BRIEF DESCRIPTION OF THE DRAWINGS

FIG. 1(a) is scratch profile of samples comprising the polycarbonate resin composition according to one embodiment of the present invention measured according to a BSP test.

FIG. 1(b) is scratch profile of samples comprising the polycarbonate resin measured according to a BSP test.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The polycarbonate resin composition may comprise about 40 to about 99% by weight of a polycarbonate resin (A) and about 1 to about 60% by weight of an acrylic copolymer (B) having a high refractive index and a flexible structure. The polycarbonate resin composition may further optionally comprise about 0 to about 60% by weight of an acrylic resin (C).

The acrylic copolymer (B) having a high refractive index and a flexible structure may include a copolymer or a combination of copolymers prepared by copolymerizing about 5 to about 99.9% by weight of an aromatic or aliphatic methacrylate monomer (b1), about 0 to about 94.5% by weight of a unsaturated monomer (b2), and about 0.1 to about 40% by weight of an acrylic monomer (b3) with high fluidity. The aromatic or aliphatic methacrylate monomer (b1) can be used as a mixture with or as a copolymer of the unsaturated monomer (b2).

Each component of the polycarbonate resin composition of the present invention now will be described more fully hereinafter in the following detailed description of the invention.

(A) Thermoplastic Polycarbonate Resin

The thermoplastic polycarbonate resin of the present invention can be prepared by known methods for preparing a polycarbonate resin composition. For example, the thermoplastic polycarbonate resin may be prepared by reacting phosgene with a dihydric phenol compound in the presence of a catalyst and a molecular weight control agent, or ester interchange reaction of carbonate precursor such as diphenyl carbonate and dihydric phenol compound.

A bisphenol compound may be used as the dihydric phenol compound. For example, 2,2-bis(4-hydroxyphenyl)propane (bisphenol A) may be used. The bisphenol A can be partially or totally substituted with another kind of dihydric phenol compound. Examples of other dihydric phenol compounds may be comprise without limitation hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether, 2,2-bis(3,5-dibromo-4-hydroxyphenyl)propane, and the like, and combinations thereof. The dihydric phenol compounds may be used as alone or as a combination thereof.

The thermoplastic polycarbonate resin of the present invention may be a single polymer comprising one kind of dihydric phenol compound, or a copolymer or combination thereof using two or more different types of dihydric phenol compounds.

Exemplary polycarbonate resins may include without limitation linear polycarbonate resins, branched polycarbonate resins, polyestercarbonate copolymer resins, and the like, and copolymers and combinations thereof.

The linear polycarbonate resin may include without limitation a bisphenol A based polycarbonate resin. The branched polycarbonate resin may include without limitation one prepared by reacting a multi-functional aromatic compound such as trimellitic acid or trimellitic anhydride with a dihydric phenol compound and carbonate precursor. The polyestercarbonate copolymer resin may include without limitation one prepared by reacting a di-functional carboxylic acid with a dihydric phenol and carbonate precursor. The linear polycarbonate resin, the branched polycarbonate resin or polyestercarbonate copolymer resin may be used alone or as a combination thereof.

The polycarbonate resin composition may include the polycarbonate resin in an amount of about 40 to about 99% by weight. If the polycarbonate resin is used in an amount less than about 40% of weight, excellent physical properties of polycarbonate such as impact strength may not be exhibited. To improve scratch resistance and physical properties, the polycarbonate resin may be used in an amount of about 50 to about 90% by weight.

(B) Acrylic Copolymer Having a High Refractive Index and a Flexible Structure

The acrylic copolymer (B) having a high refractive index and a flexible structure of the present invention may include a copolymer or a combination of copolymers prepared by copolymerizing about 5 to about 99.9% by weight of one or more aromatic or aliphatic methacrylate monomers (b1), about 0 to about 94.5% by weight of one or more unsaturated monomers (b2), and about 0.1 to about 40% by weight of one or more acrylic monomers (b3) with high fluidity.

The aromatic or aliphatic methacrylate monomer (b1) includes a methacrylate monomer substituted with an aromatic or aliphatic substituent. The methacrylate monomer (b1) can have a higher refractive index than many methacrylate monomers such as methyl methacrylate that are conventionally used when preparing a blend of a polycarbonate resin and an acrylic resin, and can increase the refractive index of the acrylic copolymer (B).

Exemplary aromatic and aliphatic substituents include substituted or unsubstituted C6-C30 aryl groups and substituted or unsubstituted C3-C18 cycloalkyl groups. As used herein, reference to a "substituted" group refers to a group substituted with one or more halogen, hydroxyl, C1-C15 alkyl, C1-C20 alkoxy, C2-C16 alkenyl, C2-C16 alkynyl, C6-C18 aryl, C7-C18 arylalkyl, C1-C20 heteroalkyl, C2-C20 heterocycle, C3-C20 heteroaryl alkyl, C3-C15 cycloalkyl, C3-C15 cycloalkenyl, C6-C15 cycloalkynyl, and C3-C20 heterocycloalkyl. Also as used herein, reference to "hetero" refers to a group in which a hydrogen is substituted with one or more of O, S, N, P, or a combination thereof.

The aromatic or aliphatic methacrylate monomer (b1) may be represented by following formula 1, formula 2, or a combination thereof.

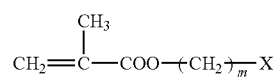
[Formula 1]

wherein m is 0 to 10 and X comprises cyclohexyl, phenyl, methyl phenyl, methylethyl phenyl, methoxy phenyl, cyclhexyl phenyl, chloro phenyl, bromo phenyl, phenyl phenyl, or benzyl phenyl.

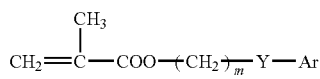
[Formula 2]

wherein m is 0 to 10, Y is O or S, and Ar comprises cyclohexyl, phenyl, methyl phenyl, methylethyl phenyl, methoxy phenyl, cyclohexyl phenyl, chloro phenyl, bromo phenyl, phenyl phenyl or benzyl phenyl.

Examples of the aromatic or aliphatic methacrylate may include without limitation cyclohexyl methacrylate, phenoxy methacrylate, phenoxy ethyl methacrylate, 2-ethylphenoxy methacrylate, 2-ethylthiophenyl methacrylate, 2-ethylaminophenyl methacrylate, phenyl methacrylate, benzyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenyl)ethyl methacrylate, 2-(4-methoxyphenyl)ethyl methacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-benzylphenyl)ethyl methacrylate, and the like. They may be used singly or as a combination thereof.

Examples of the unsaturated monomer (b2) which can be copolymerized with the aromatic or aliphatic methacrylate monomer (b1) may include without limitation methyl methacrylate, ethyl methacrylate, propyl methacrylate, methyl acrylate, ethyl acrylate, propyl acrylate, 2-hydroxypropyl acrylate, monoglycerol acrylate, acrylic acid, methacrylic acid, maleic anhydride, and the like. They may be used singly or as a combination thereof.

The aromatic or aliphatic methacrylate monomer (b1) may be used singly or in combination with the unsaturated monomer (b2) and the refractive index of the combination may be about 1.495 to about 1.570. Increasing the refractive index may improve compatibility and minimize phase separation with polycarbonate.

The acrylic monomer (b3) with high fluidity used in the present invention is represented by following formula 3.

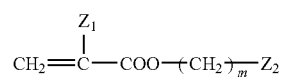
[Formula 3]

wherein m is 4 to 20, and Z1 and Z2 are each independently methyl or hydrocarbon. As used herein, the term hydrocarbon of formula 3 can include a linear or branched, for example linear, C2-C20 alkyl chain.

Examples of the acrylic monomer (b3) with high fluidity may include without limitation lauryl methacrylate, stearyl methacrylate, n-butyl methacrylate, t-butyl methacrylate, hexyl methacrylate, 2-ethylhexyl methacrylate, lauryl acrylate, stearyl acrylate, n-butyl acrylate, t-butyl acrylate, hexyl acrylate, 2-ethylhexyl acrylate and the like and they may be used singly or as a combination thereof. The acrylic copolymer (B) can have a flexible structure by including the acrylic monomer (b3) with high fluidity and comprising a linear hydrocarbon chain.

The acrylic copolymer (B) having a high refractive index and a flexible structure may have a weight average molecular weight of about 20,000 to about 400,000 and a refractive index of about 1.495 to about 1.570.

The polycarbonate resin composition may include the acrylic copolymer (B) having a high refractive index and a flexible structure in an amount of about 1 to 60% by weight, for example, about 5 to about 50% by weight, and as another example, about 10 to about 50% by weight. If the amount of the acrylic copolymer is less than about 1% by weight, scratch resistance and fluidity may not be improved. If the amount of the acrylic copolymer is more than about 60% by weight, physical properties may remarkably be reduced.

(C) Acrylic Resin

The polycarbonate resin composition of the present invention may further optionally include an acrylic resin (C). The acrylic resin may a polymer, a copolymer of one or more kinds of (meth)acrylic monomer(s) or a combination thereof. For example, the acrylic resin (C) may have a linear structure, a weight average molecular weight of about 20,000 to about 200,000, and a refractive index of about 1.490 to about 1.570.

Examples of the (meth)acrylic monomer may include without limitation methyl methacrylate, ethyl methacrylate, n-propyl methacylate, phenyl methacrylate, benzyl methacrylate, cyclohexyl methacrylate, phenoxy methacrylate, phenoxyethyl methacrylate, methyl acrylate, ethyl acrylate, propyl acrylate and the like. The (meth)acrylic monomer may be used singly or as a combination thereof.

The acrylic resin (C) can be prepared by known methods such as emulsion polymerization, suspension polymerization, or bulk polymerization, and the preparation thereof can be readily carried out by a person of ordinary skill in the art.

Moreover, the acrylic resin (C) may be a single polymer, a copolymer of two or more kinds of (meth)acrylic monomers or a combination thereof.

The polycarbonate resin composition can include the acrylic resin (C) in an amount of about or less than about 60% by weight, for example, less than about 50% by weight, and as another example, about 10 to about 50% by weight. If the amount of the acrylic resin (C) is more than about 60% by weight, excellent physical properties may not be exhibited.

Adding the acrylic copolymer (B) having a high refractive index and a flexible structure to a blend of polycarbonate (A) and an acrylic resin (C) can provide high coloring and high transparency by reducing the difference between the refractive indices of the polycarbonate resin and the acrylic resin.

Further, high fluidity may be provided by the flexible structure used during copolymerization. Accordingly, the present invention can provide a thermoplastic resin having excellent transparency and scratch resistance due to improved compatibility of existing polycarbonate and acrylic resins during blending and having excellent processability due to high fluidity.

The polycarbonate resin composition of the present invention may be prepared by known methods. For example, the components of the present invention and optionally additives can be mixed, and the mixture can be melt extruded using an extruder and prepared in pellet form. A molded article may be prepared using the pellets.

The polycarbonate resin composition may further comprise one or more additives. Exemplary additives include without limitation flame retardants, antimicrobial agents, lubricants, heat stabilizers, antioxidants, light-stabilizers, compatibilizers, dyes, inorganic additives, surfactant, nucleating agents, coupling agents, filler, plasticizers, impact modifiers, admixtures, colorants, stabilizers, slip agents, antistatic compounds, pigments and the like and combinations thereof.

The polycarbonate resin composition of the present invention may be used to mold various products having excellent scratch resistance, coloring and transparency. In addition, because the polycarbonate resin composition can have excellent fluidity, the polycarbonate resin composition can be used in a wide variety of applications, such as parts of automobiles, materials for electrical/electronic appliances, lens, windows and the like, the shapes of many of which are increasingly complicated and/or thinner.

In one embodiment of the present invention, the polycarbonate resin composition may be used to manufacture housings of electrical/electronic appliances such as TVs, audio devices, washing machines, cassette players, MP3s, telephones, game players, video players, computers, copy machines and the like.

In another embodiment of the present invention, the polycarbonate resin composition having scratch resistance may be used in materials for automobiles such as instrument panels, door panels, quarter panels and the like.

The molding method may comprise without limitation extrusion molding, injection molding, casting, and the like. The molding method can be readily carried out by a person of ordinary skill in the art.

The invention may be better understood by reference to the following examples which are intended for the purpose of illustration and are not to be construed as in any way limiting the scope of the present invention, which is defined in the claims appended hereto.

EXAMPLES AND COMPARATIVE EXAMPLES

Components used in the following examples and comparative examples are prepared as follows.

(A) Polycarbonate Resin

Bisphenol-A based polycarbonate with a weight average molecular weight of 25,000 (Mw) made by Teijin Chemicals Ltd. of Japan (product name: Panlite L'1250 AP) is used as the polycarbonate resin in the examples and comparative examples.

(B) Acrylic Copolymer Having High Refractive Index and a Flexible Structure (B1) Acrylic copolymer having high refractive index and a flexible structure-1

Acrylic copolymer having a high refractive index and a flexible structure, a refractive index of 1.520 and a weight average molecular weight of 50,000 is prepared by typical suspension polymerizing 40% by weight of benzyl methacrylate monomer, 50% by weight of methyl methacrylate, and 10% by weight of stearyl methacrylate.

(B2) Acrylic Copolymer Having High Refractive Index and a Flexible Structure-2

Acrylic copolymer having a high refractive index and a flexible structure, a refractive index of 1.520 and a weight average molecular weight of 80,000 is prepared by typical suspension polymerizing 40% by weight of benzyl methacrylate monomer, 50% by weight of methyl methacrylate, and 10% by weight of stearyl methacrylate.

(B3) Acrylic Copolymer Having High Refractive Index and a Flexible Structure-3

Acrylic copolymer having a high refractive index and a flexible structure, a refractive index of 1.520 and a weight average molecular weight of 130,000 is prepared by typical suspension polymerizing 40% by weight of benzyl methacrylate monomer, 50% by weight of methyl methacrylate, and 10% by weight of stearyl methacrylate.

(B4) Acrylic Copolymer Having High Refractive Index and a Flexible Structure-4

Acrylic copolymer having a high refractive index and a flexible structure, a refractive index of 1.520 and a weight average molecular weight of 200,000 is prepared by typical suspension polymerizing 40% by weight of benzyl methacrylate monomer, 50% by weight of methyl methacrylate, and 10% by weight of stearyl methacrylate.

(B5) Acrylic Copolymer Having High Refractive Index and a Flexible Structure-5

Acrylic copolymer having a high refractive index and a flexible structure, a refractive index of 1.520 and a weight average molecular weight of 130,000 is prepared by typical suspension polymerizing 40% by weight of benzyl methacrylate monomer, 55% by weight of methyl methacrylate, and 5% by weight of stearyl methacrylate.

(B6) Acrylic Copolymer Having High Refractive Index and a Flexible Structure-6

Acrylic copolymer having a high refractive index and a flexible structure, a refractive index of 1.520 and a weight average molecular weight of 130,000 is prepared by typical suspension polymerizing 40% by weight of benzyl methacrylate monomer, 50% by weight of methyl methacrylate, and 10% by weight of butyl methacrylate.

(B7) Acrylic Copolymer Having High Refractive Index and a Flexible Structure-7

Acrylic copolymer having a high refractive index and a flexible structure, a refractive index of 1.520 and a weight average molecular weight of 130,000 is prepared by typical suspension polymerizing 40% by weight of benzyl methacrylate monomer, 50% by weight of methyl methacrylate, and 10% by weight of lauryl methacrylate.

(C) Acrylic Resin (C1) Acrylic Resin-1

Linear acrylic resin having a refractive index of 1.490 and a weight average molecular weight of 130,000 is prepared by typical suspension polymerizing 100% by weight of methyl methacrylate monomer.

(C2) Acrylic Resin-2

Linear acrylic resin having a refractive index of 1.520 and a weight average molecular weight of 50,000 is prepared by typical suspension polymerizing 60% by weight of methyl methacrylate monomer and 40% by weight of benzyl methacrylate.

(C3) Acrylic Resin-3

Linear acrylic resin having a refractive index of 1.520 and a weight average molecular weight of 130,000 is prepared by typical suspension polymerizing 60% by weight of methyl methacrylate monomer and 40% by weight of benzyl methacrylate.

(C4) Acrylic Resin-4

Linear acrylic resin having a refractive index of 1.520 and a weight average molecular weight of 200,000 is prepared by typical suspension polymerizing 60% by weight of methyl methacrylate monomer and 40% by weight of benzyl methacrylate.

Examples 1 to 8 and Comparative Examples 1 to 4

The components shown in the following Table 1 are added to a mixer, and the mixture is extruded through an extruder (L/D=29, Φ=45 mm) to prepare pellets. Samples are prepared from the pellets using a 6-oz injector after the prepared pellets are dried under conditions of a temperature at 80° C. for 6 hours.

Molecular weights are measured by using GPC (gel permeation chromatography), and the measured weight average molecular weight is set forth in Table 1 below.

Compatibility and transparency of the resin compositions are determined based on the existence or nonexistence of a flow mark, transparency and transmissivity (transmittance). The flow mark and the transparency on the surface are measured with the naked eye.

Melt flow index is measured according to ASTM D1238 under the conditions of a temperature of 250° C. and loading of 5 kg and the results are set forth in Table 1 below.

Scratch resistance is measured by a BSP (Ball-type Scratch Profile) test. The BSP test is conducted by applying a scratch of a length of 10 to 20 mm to a surface of the resin and measuring the profile of the applied scratch using a surface profile analyzer. The scratch resistance is evaluated based on the scratch width, scratch depth, scratch range and scratch area of the measured profile. The surface profile analyzer can be a contact-type or non-contact-type. The contact type provides a scratch profile through a surface scan using a metal stylus tip with a diameter of 1 to 2 μm. The non-contact-type includes a three dimensional microscope and optical analyzer such as an atomic force microscope (AFM). In the present invention, a contact-type surface profile analyzer (XP-1) available from Ambios Technology is used, and a metal stylus tip with a diameter of 2 μm is used. The measured scratch area is reduced as the scratch resistance is increased. The unit of the scratch area is μm. The load is 1,000 g, scratch speed is 75 mm/min, and a metal spherical tip with a diameter of 0.7 mm is used during measuring the scratch. The size of the samples used for measuring scratch resistance is L90 mm×W50 mm×t2.5 mm.

A picture of the scratch profile of Example 3 measured by the BSP test is represented in FIG. 1 (a), and a picture of the scratch profile of Comparative Example 5 measured by the BSP test is represented in FIG. 1 (b). The results of the BSP test are set forth in Table 1 below.

TABLE 1

|  |  | Examples | | | | | | | | Comparative Examples | | | | |
| --- | --- | --- | --- | --- | --- | --- | --- | --- | --- | --- | --- | --- | --- | --- |
|  |  | 1 | 2 | 3 | 4 | 5 | 6 | 7 | 8 | 1 | 2 | 3 | 4 | 5 |
| (A) |  | 70 | 70 | 70 | 70 | 70 | 70 | 70 | 70 | 70 | 70 | 70 | 70 | 100 |
| (B) | (B1) | 30 | | | | | | | | | | | | |
|  | (B2) | | 30 | | | | | | | | | | | |
|  | (B3) | | | 30 | | | | | 15 | | | | | |
|  | (B4) | | | | 30 | | | | | | | | | |
|  | (B5) | | | | | 30 | | | | | | | | |
|  | (B6) | | | | | | 30 | | | | | | | |
|  | (B7) | | | | | | | 30 | | | | | | |
| (C) | (C1) | | | | | | | | | 30 | | | | |
|  | (C2) | | | | | | | | | | 30 | | | |
|  | (C3) | | | | | | | | 15 | | | 30 | | |
|  | (C4) | | | | | | | | | | | | 30 | |
| (B)&(C) Molecular weight | Mw | 50K | 80K | 130K | 200K | 130K | 130K | 130K | 130K | 130K | 50K | 130K | 200K | — |
| Flow Mark |  | X | X | X | X | X | X | X | X | ○ | X | X | X | X |
| Transparency and color |  | translucence | tranlucence | translucence | translucence | translucence | translucence | translucence | translucence | opacity | translucence | translucence | translucence | translucence |
| Total light transmittance (TT) |  | 40.81 | 39.23 | 37.18 | 27.06 | 39.04 | 37.50 | 37.01 | 39.48 | 3.47 | 41.53 | 39.66 | 27.33 | 88.92 |
| Izod impact strength (⅛") |  | 11.3 | 15.3 | 19.7 | 24.0 | 19.1 | 20.3 | 19.5 | 18.7 | 34.1 | 10.8 | 18.0 | 19.2 | 93.2 |
| Melt Index (g/10 min) |  | 22.91 | 20.51 | 18.17 | 9.79 | 10.77 | 17.49 | 18.23 | 8.64 | 6.70 | 7.86 | 5.16 | 3.04 | 1.77 |
| BSP |  | 283.9 | 286.9 | 288.6 | 292.6 | 288.0 | 288.1 | 290.7 | 287.9 | 286.9 | 283.4 | 287.8 | 291.8 | 347.5 |

The transmissivities (transmittance) of samples are represented by measuring total light transmittance (TT) using a Haze meter NDH 2000 device by Nippon Denshoku. The total light transmittance is calculated based on the total quantity of light of diffusion light transmittance (DT) and parallel light transmittance (PT). A high value for the total light transmittance (TT) indicates excellent transparency.

The impact strength (kgf·cm/cm) of notched samples with a thickness of ⅛" is measured according to ASTM D256, and the results are set forth in Table 1 below.

It can be seen that a blend of acrylic resin with polycarbonate such as Examples 1 to 7 and Comparative Examples 1 to 3 of the Table 1 has better scratch resistance than polycarbonate alone (Comparative Example 5), as demonstrated by the scratch profile of FIG. 1 and the BSP (scratch area) of Table 1.

However, phase separation is revealed, because compatibility between polycarbonate and polymethyl methacrylate is reduced during blending. This in turn results in the observation of a flow mark in appearance. Accordingly, the translucence appearance of opaline and transmissivity are significantly reduced, so it can be difficult to use such compositions as exterior finishing materials.

To solve these problems, adding a copolymer comprising an acrylic monomer having a high refractive index (Comparative Examples 2 to 4) improves compatibility between the polycarbonate and acrylic resin, the flow mark disappears, and transmissivity improves. So it is seen that the transparency is improved. However, it is difficult to use the polymer for products requiring molding a thin film.

When an acrylic resin with a low molecular weight such as Comparative Example 2 is used, fluidity improves, but the impact strength is significantly reduced.

Adding an acrylic copolymer having a high refractive index and flexible structure prepared by including an acrylic monomer having a high fluidity and acrylic monomer having a high refractive index of Examples 1 to 7 of the present invention improves compatibility as compared to Comparative Example 1, and has excellent compatibility and excellent fluidity without reduction of impact strength and scratch resistance as compared to Comparative Examples 2 to 3.

Examples 1 to 3 including an acrylic copolymer with a relatively low molecular weight have high fluidity with high transparency compared to Example 4. Examples 1 to 4 including an acrylic copolymer with a flexible structure have better fluidity than Comparative Examples 2 to 4 including an acrylic copolymer with the same molecular weight. Moreover, the trend of increasing the fluidity is represented in Example 3 which has a larger amount of acrylic monomer having high fluidity than Example 5.

Examples 6 and 7 including two different kinds of acrylic monomer having high fluidity represent high fluidity such as Example 3.

The acrylic copolymer (B) having a high refractive index and a flexible structure is added to polycarbonate such as Examples 1 to 7, or added to other acrylic resin to polycarbonate such as Example 8. When the acrylic copolymer (B) having a high refractive index and a flexible structure is added with another acrylic resin, the effect of improving fluidity is reduced, but loss of transparency does not appear.

From the result of the Table 1, when polycarbonate and acrylic resin include an acrylic copolymer resin in an amount of the invention, the resin composition does not exhibit reduced compatibility and scratch resistance and further can exhibit excellent impact strength and fluidity.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition comprising
about 40 to about 99% by weight of a polycarbonate resin (A), and
about 1 to about 60% by weight of an acrylic copolymer (B) having a high refractive index, wherein said acrylic copolymer (B) comprises a copolymer or a combination of copolymers prepared by copolymerizing about 5 to about 99.9% by weight of one or more aromatic methacrylate or aliphatic methacrylate monomers (b1) comprising phenoxy methacrylate, phenoxy ethyl methacrylate, 2-ethylphenoxy methacrylate, 2-ethylthiophenyl methacrylate, 2-ethylaminophenyl methacrylate, phenyl methacrylate, benzyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenyl)ethyl methacrylate, 2-(4-methoxyphenyl)ethyl methacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-benzylphenyl)ethyl methacrylate, or a combination thereof, about 0 to about 94.5% by weight of one or more unsaturated monomers (b2), and about 0.1 to about 40% by weight of one or more acrylic monomers (b3) with high fluidity represented by the following Formula 3:

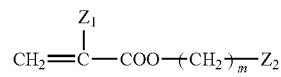

[Formula 3]

wherein m is 11 to 20, and $Z_1$ and $Z_2$ are each independently methyl or hydrocarbon.

2. The polycarbonate resin composition of claim 1, further comprising about 0 to about 60% by weight of an acrylic resin (C).

3. The polycarbonate resin composition of claim 1, wherein said acrylic copolymer (B) has a weight average molecular weight of about 20,000 to about 400,000.

4. The polycarbonate resin composition of claim 1, wherein said acrylic copolymer (B) has a refractive index of about 1.495 to about 1.570.

5. The polycarbonate resin composition of claim 1, wherein said unsaturated monomer (b2) comprises methyl methacrylate, ethyl methacrylate, propyl methacrylate, methyl acrylate, ethyl acrylate, propyl acrylate, 2-hydroxypropyl acrylate, monoglycerol acrylate, acrylic acid, methacrylic acid, maleic anhydride, or a combination thereof.

6. The polycarbonate resin composition of claim 1, wherein said acrylic monomer (b3) comprises lauryl methacrylate, stearyl methacrylate, or a combination thereof.

7. The polycarbonate resin composition of claim 2, wherein said acrylic resin (C) comprises a polymer or a copolymer of one or more different (meth) acrylic monomers or a combination thereof, wherein said acrylic resin (C) has a linear structure.

8. The polycarbonate resin composition of claim 7, wherein said (meth) acrylic monomer comprises methyl methacrylate, ethyl methacrylate, n-propyl methacylate, phenyl methacrylate, benzyl methacrylate, cyclohexyl methacrylate, phenoxy methacrylate, phenoxyethyl methacrylate, or a combination thereof.

9. The polycarbonate resin composition of claim 2, wherein said acrylic resin(C) has a weight average molecular weight of about 20,000 to about 200,000.

10. The polycarbonate resin composition of claim 2, wherein said acrylic resin(C) has a refractive index of about 1.490 to about 1.570.

11. The polycarbonate resin composition of claim 1, further comprising an additive comprising a flame retardant, antimicrobial agent, lubricant, heat stabilizer, antioxidant, light-stabilizer, compatibilizer, dye, inorganic additive, surfactant, nucleating agent, coupling agent, filler, plasticizer, impact modifier, admixture, colorant, stabilizer, slip agent, anti-static compound, pigment or a combination thereof.

12. A molded article prepared from the polycarbonate resin composition of claim 1.

* * * * *